(No Model.) 2 Sheets—Sheet 1.
G. BENSON.
MACHINE FOR CUTTING KEY SEATS.
No. 388,946. Patented Sept. 4, 1888.
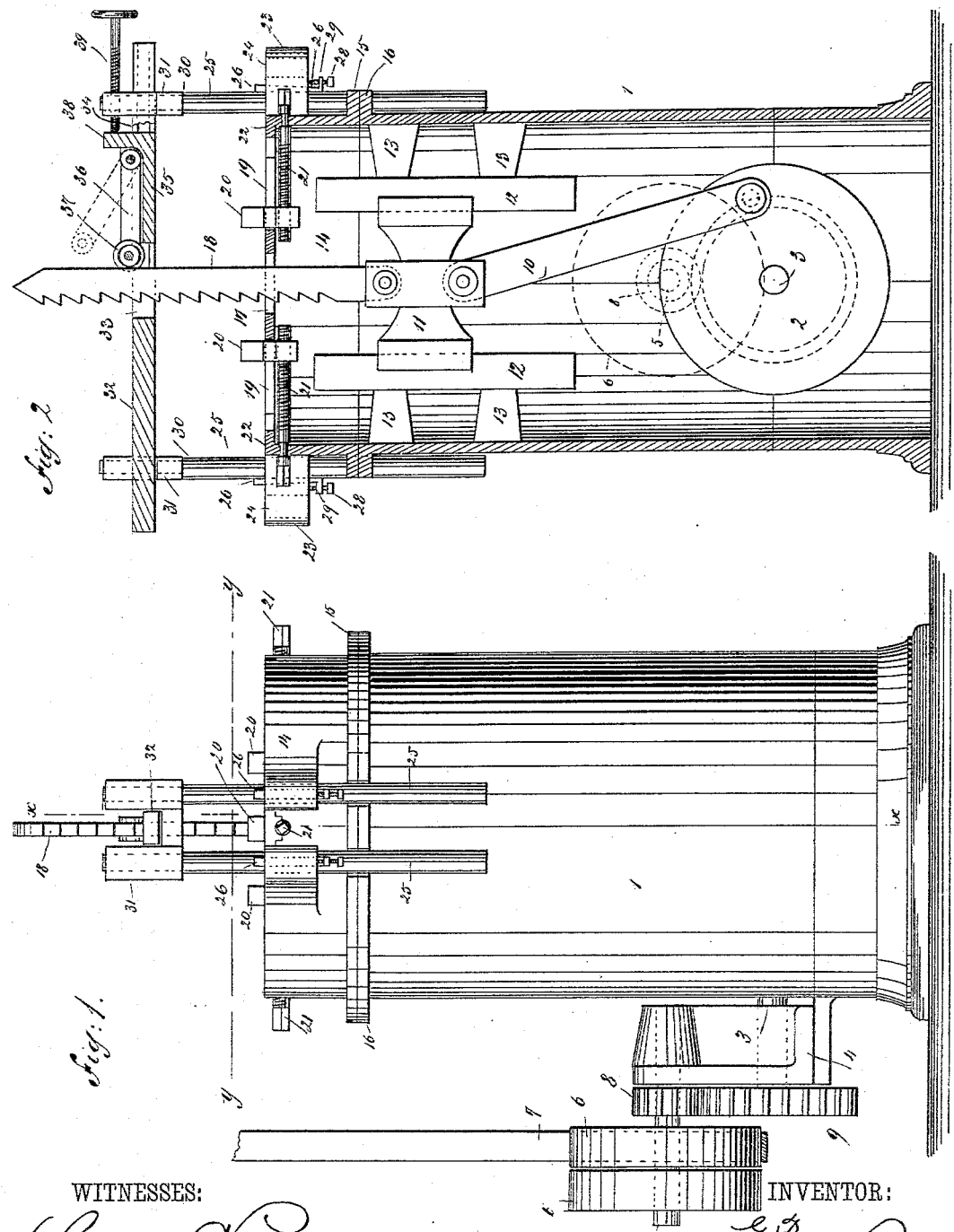
WITNESSES:
INVENTOR:
G. Benson
BY Munn & Co
ATTORNEYS.

(No Model.) 2 Sheets—Sheet 2.

G. BENSON.
MACHINE FOR CUTTING KEY SEATS.

No. 388,946. Patented Sept. 4, 1888.

WITNESSES:
Chas. Nida
C. Sedgwick

INVENTOR:
G. Benson
BY Munn & Co.
ATTORNEYS.

UNITED STATES PATENT OFFICE.

GEORGE BENSON, OF DURHAM, ENGLAND.

MACHINE FOR CUTTING KEY-SEATS.

SPECIFICATION forming part of Letters Patent No. 388,946, dated September 4, 1888.

Application filed December 16, 1887. Serial No. 258,064. (No model.)

*To all whom it may concern:*

Be it known that I, GEORGE BENSON, of Durham, England, have invented a new and Improved Machine for Cutting Key-Seats, of which the following is a full, clear, and exact description.

This invention relates to machines for cutting slots or key-seats in wheels and pulleys, and has for its objects to hold the saw or cutter to its work and automatically relieve it in its upstroke, to accurately adjust it for the depth of cut, and to provide for holding wheels of different thickness and diameter.

The invention consists in a machine for cutting key-seats constructed and arranged as hereinafter described and claimed.

Reference is to be had to the accompanying drawings, forming a part of this specification, in which similar figures of reference indicate corresponding parts in all the views.

Figure 4:
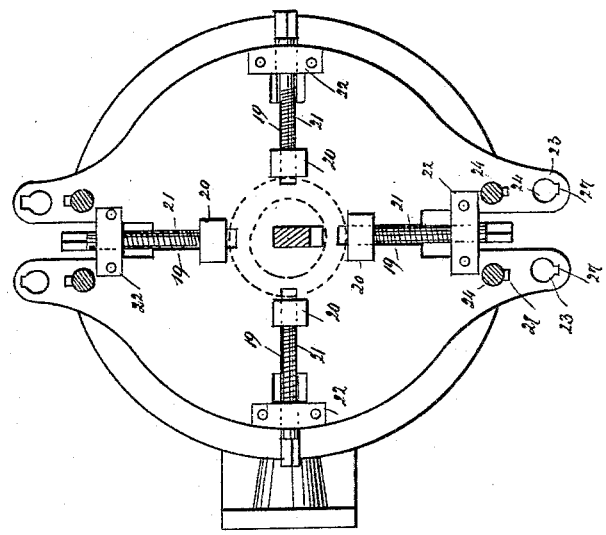
Figure 3:
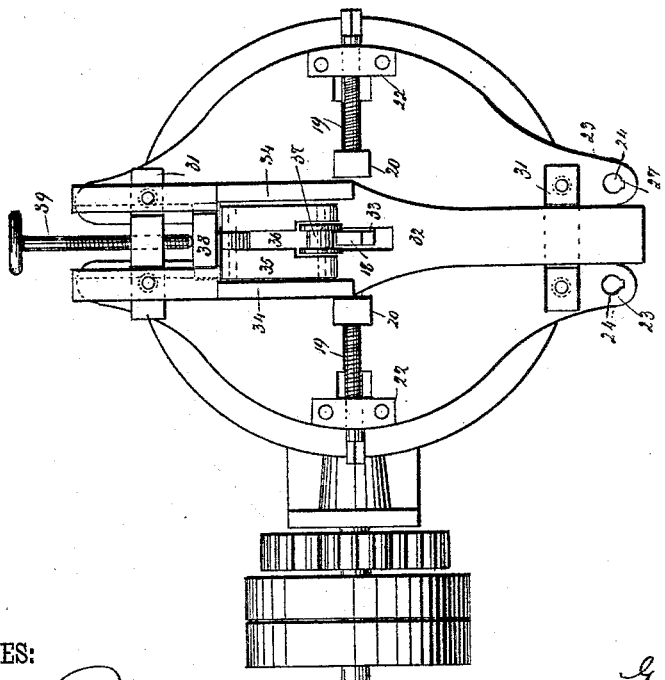

Figure 1 represents a machine for cutting key-seats constructed in accordance with this invention. Fig. 2 is a vertical section thereof on the line $x$ $x$, Fig 1. Fig. 3 is a plan view, and Fig. 4 is a plan view in horizontal section on line $y$ $y$, Fig. 1.

In carrying out this invention the operating parts are mounted in a suitable frame or casing, 1, containing a driving-wheel, 2, on shaft 3, extending through casing 1, and a bracket, 4, supporting a shaft, 5, on which are mounted band-pulleys 6, driven by a band, 7, and a gear-wheel, 8, meshing with a gear-wheel, 9, on shaft 3. The driving-wheel 2 is connected by a crank-arm, 10, with a cross-head, 11, sliding on ways 12, mounted on arms 13, projecting from the inner sides of the casing or frame. The casing 1 is formed with a removable part, 14, secured by means of a flange, 15, fastened in any suitable manner to a flange, 16, on the fixed part of the casing. By this means access may be had to the interior of the frame or casing 1. The top of the removable part 14 is formed with a slot, 17, of a length sufficient to permit of horizontal play of the saw or cutter 18, pivoted to cross-head 11 in its operation and in gaging it to its work. The top of part 14, which serves as a bed-plate for the wheels to be cut, also has slots 19, in which slide jaws or clamps 20, operated by adjusting-screws 21, mounted in blocks 22. The clamps 20 hold the hub of the wheel to be cut, (as shown by dotted lines in Fig. 4,) three of said clamps serving as guides and the fourth to secure and release the hub.

Upon the edge of part 14 are located brackets 23, integral therewith or secured thereto in any suitable manner, and provided with slots 24, which may be square or round.

Uprights 25 are adjustably held in the slots 24 by means of wedge-shaped keys 26, inserted in corresponding slots, 27, in slots 24, and having adjusting-screws 28, passing through projections 29 in keys 26 and bearing against the under side of brackets 23. By means of this construction of the uprights 25 they may be adjusted vertically to allow for the thickness of the wheels to be cut, and horizontally by moving them laterally in slots 24 to accommodate wheels of different diameters. The uprights 25 are formed with shoulder portions 30, on which rest recessed perforated blocks 31. Within the blocks 31 rest the ends of a feed-plate, 32, having a slot, 33, of a length sufficient to permit of the horizontal movement of the saw 18 in its operation and in gaging it to its work. The feed-plate 32 is also provided with slotted strips 34, in which slides a plate, 35, having an arm, 36, pivoted thereto, which is preferably provided with a friction-roller, 37, adapted to bear against the saw 18. It will be seen that the arm 36 is free to move upward and yield to the upstroke of the saw. A projection, 38, on plate 35 serves as a seat to a set screw, 39, mounted in one of the blocks 31. By means of the set-screw 39, plate 35, and arm 36 the saw 18 may be accurately adjusted to its work. If desired, any suitable gage may be located adjacent to slot 34, whereby the adjustment of the depth of cut may be determined.

In the operation of this device, plate 32 is lifted off of uprights 25, and the wheel to be cut is placed on bed-plate 14, with saw 18 projecting through the hole in the center of the wheel. The hub of the wheel is adjusted and clamped in blocks 20, and if the diameter of the wheel requires it the uprights 25 are inserted in the outer slots, 24, in brackets 23, and held at the desired height by means of the keys 26 and set-screws 28. The plate 32 is then replaced on blocks 31, with saw 18 projecting through slot 33. The operating mechanism being started, the saw 18 is held to its work in the downward stroke by arm 36, and the depth of cut is adjusted by gradually tightening up screw 39. In the upward stroke of saw 18 the arm 36 will automatically yield to the saw, thereby releasing its pressure, and will also automatically return to its horizontal position, as shown in Fig. 2, upon the downstroke, thereby holding the saw to its work. In this way damage to the saw or cutter is avoided. Accuracy of depth of cut is obtained by means of the set-screws, plate, or arm, instead of the old form of lever, and wheels of different thickness and diameter can be held in the machine.

Having thus described my invention, what I claim as new, and desire to secure by Letters Patent, is—

1. A machine for cutting key-seats in wheels or pulleys, consisting of a reciprocating cutter provided with suitable operating mechanism mounted in a frame having a slotted bed-plate with adjustable clamps, and slotted brackets provided with adjustable uprights, a slotted feed-bar loosely mounted on the uprights, a sliding plate adjustable on the feed-bar, and an arm pivoted on the sliding plate and adapted to bear against the cutter to hold it to its work in one direction of its movement, and to automatically yield thereto in the opposite direction, substantially as described.

2. In a machine for cutting key-seats, the combination, with slotted brackets on the machine, of uprights adjustable vertically and horizontally in said brackets and supporting a slotted feed-bar having a pivoted arm or pawl adjustable against a cutter and holding the latter to its work in one direction of its movement, and yielding thereto in the opposite direction, substantially as described.

3. In a machine for cutting key-seats, casing 1, having brackets 23, with slots or holes 24, in combination with uprights 25, having shoulders 30 and blocks 31, feed-plate 32, loosely mounted thereon and having slotted strip 34, sliding plate 35, having pivoted arm 36, with friction-roller 37, and set-screw 39, mounted in block 31, substantially as described.

4. In a machine for cutting key-seats, the combination, with casing 1, having slotted brackets 23, of uprights 25, slotted feed-bar 32, and adjustable plate 35, having pivoted arm 36, substantially as described.

5. In a machine for cutting key-seats for wheels or pulleys, the combination, with casing 1, having slotted bed-plate 14, with clamps 20, adjusting-screws 21, and slotted brackets 23, of shouldered uprights 25, with clamps, substantially as described, adjustable in brackets 23, and having slotted feed-plate 32 and sliding plate 35, with pivoted arm 36, and means, substantially as described, for adjusting plate 35, as shown and described.

6. A machine for cutting key-seats, consisting of casing 1, cutter 18, with suitable operating mechanism, substantially as shown and described, slotted bed-plate 14, having adjustable clamps 20, slotted brackets 23, shouldered uprights 25, with keys 26 and screws 28, slotted feed-bar 32, having sliding plate 35, with pivoted arm 36, and means, substantially as described, for adjusting plate 35, as shown and described.

GEORGE BENSON.

Witnesses:
JOSEPH SHAW,
EDWARD W. CADY.